(12) United States Patent
Meixner et al.

(10) Patent No.: US 7,686,330 B2
(45) Date of Patent: Mar. 30, 2010

(54) GAS GENERATOR

(75) Inventors: Rudolf Meixner, Wurmannsquick (DE); Helmut Pritz, Ampfing (DE)

(73) Assignee: TRW Airbag Systems GmbH, Aschau Am Inn (DE)

( * ) Notice: Subject to any disclaimer, the term of this patent is extended or adjusted under 35 U.S.C. 154(b) by 545 days.

(21) Appl. No.: 11/524,141

(22) Filed: Sep. 20, 2006

(65) Prior Publication Data

US 2007/0080529 A1    Apr. 12, 2007

(30) Foreign Application Priority Data

Oct. 7, 2005    (DE)    .................. 20 2005 015 793 U

(51) Int. Cl.
*B60R 21/26*    (2006.01)

(52) U.S. Cl. ...................................... 280/741

(58) Field of Classification Search ................. 280/740, 280/736, 742

See application file for complete search history.

(56) References Cited

U.S. PATENT DOCUMENTS

| | | | |
|---|---|---|---|
| 4,998,750 A | 3/1991 | Werner et al. | |
| 5,851,030 A * | 12/1998 | Johnson et al. | 280/741 |
| 6,196,583 B1 * | 3/2001 | Ruckdeschel et al. | 280/736 |
| 6,237,498 B1 * | 5/2001 | Winterhalder et al. | 102/530 |
| 6,412,814 B1 * | 7/2002 | Huber et al. | 280/736 |
| 6,474,685 B1 * | 11/2002 | Meixner et al. | 280/741 |
| 6,616,183 B2 * | 9/2003 | Huber et al. | 280/736 |
| 6,997,475 B2 * | 2/2006 | Watase et al. | 280/737 |
| 7,293,796 B2 * | 11/2007 | Meixner et al. | 280/736 |
| 7,438,313 B2 * | 10/2008 | Bilbrey et al. | 280/737 |
| 2003/0047923 A1 * | 3/2003 | Ogawa et al. | 280/737 |
| 2003/0101893 A1 * | 6/2003 | Cord | 102/530 |
| 2005/0067822 A1 | 3/2005 | Meixner et al. | |
| 2005/0189755 A1 | 9/2005 | Numoto et al. | |

FOREIGN PATENT DOCUMENTS

| | | |
|---|---|---|
| DE | 19600843 | 1/1997 |
| DE | 19611102 | 9/1997 |

* cited by examiner

*Primary Examiner*—Paul N Dickson
*Assistant Examiner*—Karen Jane J Amores
(74) *Attorney, Agent, or Firm*—Tarolli, Sundheim, Covell & Tummino LLP

(57) ABSTRACT

A gas generator has a tubular housing in which a combustion chamber containing a propellant charge, an outflow chamber and a clearance volume are disposed, positioned behind one another axially. A partition disk is provided between the clearance volume and the outflow chamber and has a central opening and an integrally formed tube section which surrounds the opening and extends to its free end away from the clearance volume towards the combustion chamber.

15 Claims, 4 Drawing Sheets

GAS GENERATOR

TECHNICAL FIELD

The invention relates to a gas generator.

BACKGROUND OF THE INVENTION

From DE 203 13 664 U1 a gas generator is known comprising a tubular housing in which a combustion chamber containing a propellant charge, an outflow chamber and a clearance volume are disposed, positioned behind one another axially. A partition disk is provided between the clearance volume and the outflow chamber and has a central opening and an integrally formed tube section which surrounds the opening. The clearance volume delimited here by the partition disk lies apart from a direct flow path from the inflow openings into the outflow chamber to the outflow openings of the same in the gas generator housing. Gas flowing into the clearance volume is forced to deflect by means of which on the one hand a cooling effect, and on the other hand a particle separation, which can be equated to a filter effect, is achieved.

It is the object of the invention to provide an improved gas generator with regard to cooling effect and particle separation.

BRIEF SUMMARY OF THE INVENTION

This is achieved with a gas generator having a tubular housing in which a combustion chamber containing a propellant charge, an outflow chamber and a clearance volume are disposed, positioned behind one another axially. A partition disk is provided between the clearance volume and the outflow chamber and has a central opening and an integrally formed tube section which surrounds the opening and extends to its free end away from the clearance volume towards the combustion chamber. This special design of the partition disk directs a larger portion of the gas produced first of all into the clearance volume, in which it is deflected, before it finally leaves the gas generator via outflow openings in the housing. In this way, improved cooling of the gas and increased particle separation in the clearance volume is achieved.

According to one embodiment of the invention, the tube section extends into the outflow chamber; in particular, the clearance volume is only in fluid communication with the outflow chamber, and this gives a particularly simple structure.

In the region of the outflow chamber, the housing advantageously has several outflow openings, and the tube section of the partition disk extends axially, as observed from the clearance volume, into the outflow chamber up to beyond the outflow openings. In this way, the outflow openings are, as it were, covered by the tube section, because of which a particularly large portion of the gas produced is first of all directed into the clearance volume. Furthermore, in this way, that part of the gas which flows out of the clearance volume via the tube section to the outflow openings is forced to deflect by almost 180°, and this in turn increases the effectiveness with regard to cooling and particle reduction.

Another embodiment proposes that the tube section extends axially over the whole length of the outflow chamber. In particular, the free end of the tube section rests against a separation wall of the outflow chamber near to the combustion chamber. In this way, an annular outflow chamber is formed which fully encloses the tube section, the gas flowing from the combustion chamber directly into the tube section upon activation of the gas generator.

Preferably, in the non-activated state of the gas generator, the clearance volume is in fluid communication both with the combustion chamber and with the outflow chamber. Gas produced in the combustion chamber can therefore flow into the clearance volume in which it is deflected, after which it leaves the clearance volume heading towards the outflow chamber.

The partition disk can have several first flow-through openings by means of which the clearance volume is in direct fluid communication with the outflow chamber.

The tube section preferably has several second flow-through openings by means of which the inside of the tube section is in fluid communication with the outflow chamber. These second flow-through openings produce an indirect connection of both the combustion chamber and the clearance volume to the outflow chamber.

In order to produce particularly favorable flow conditions, the ratio of the total area of the second flow-through openings to the total area of the first flow-through openings should be 10 to 50%, preferably 30%.

The first flow-through openings are preferably disposed near to outflow openings which are formed in the housing in the region of the outflow chamber. In this way gas, which leaves the clearance volume via the first flow-through openings, is deflected by approximately 90° towards the outflow openings.

The second flow-through openings are preferably disposed a distance away from outflow openings which are formed in the housing in the region of the outflow chamber, by means of which the gas flow is forced to deflect by about 180°.

A particularly good cooling effect and a particularly high level of particle separation can moreover be achieved in that the volume of the outflow chamber is 10 to 50%, preferably 30% of the volume of the clearance volume.

A further particularly effective embodiment of the gas generator according to the invention distinguishes itself in that the combustion chamber has one or more inflow openings, and that one or more flow-through openings are provided between the clearance volume and the outflow chamber, the total area of the inflow openings being smaller than the total area of the flow-through openings. The flow-through opening/s is/are to be understood here as being the flow connection between the clearance volume and the outflow chamber, i.e. in particular also the central opening of the partition disk in so far as the latter opens directly into the outflow chamber.

In order to further improve the filter effect, a filter can additionally be disposed in the outflow chamber.

DETAILED DESCRIPTION OF THE PREFERRED EMBODIMENTS

Figure 1:
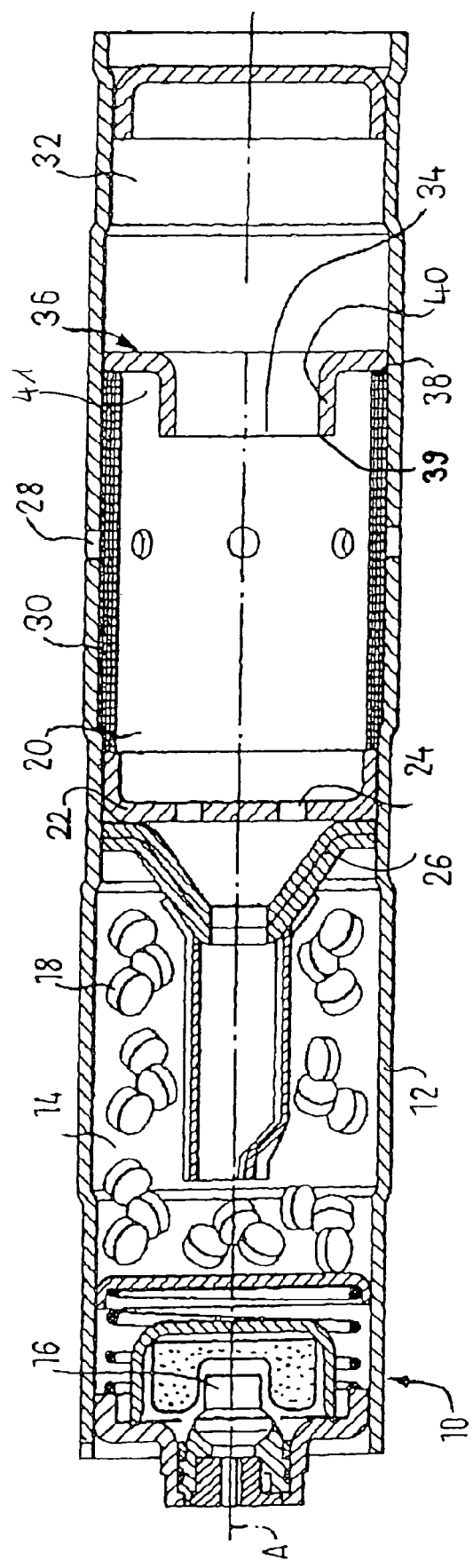
FIG. 1 shows a schematic sectional view of a gas generator according to a first embodiment of the invention.

FIG. 1 shows a gas generator 10 which has a tubular housing 12. Inside the housing 12, on the left-hand axial end as observed in the Figure, a combustion chamber 14 is disposed which is connected to an igniter 16 and contains a propellant charge 18 in the form of propellant tablets.

In the axial direction A, observed in the flow direction, an outflow chamber 20 adjoins the combustion chamber 14. Between the combustion chamber 14 and the outflow chamber 20, a separation wall 22 is provided which has several inflow openings 24 by means of which the combustion chamber 14 is connected to the outflow chamber 20. Observed in the flow direction, a preliminary filter 26, known per se, is disposed in front of the separation wall 22. In the region of the outflow chamber 20, the cylindrical housing 12 has several outflow openings 28 through which a gas, produced in the combustion chamber 14 from the propellant charge 18, can leave the outflow chamber 20 and so the gas generator 10. A filter 30 can optionally be provided in front of the outflow openings 28.

Observed in the flow direction of the gas, behind the outflow chamber 20 (on the right in FIG. 1) a clearance volume 32 is disposed which is separated from the outflow chamber 20 by means of a partition disk 36 provided with an opening 34. One edge 38 of the partition disk 36 is connected, for example welded here to the housing 12. An integrally formed, cylindrical tube section 40 surrounds the opening 34 and extends with its free end 39 away from the clearance volume 32 towards the combustion chamber 14 into the outflow chamber 20. Because the partition disk 36 does not have any further opening, the clearance volume 32 is in exclusive fluid communication with the outflow chamber 20.

In the activated state of the gas generator 10, the gas produced moves out of the combustion chamber 14, through the inflow openings 24, into the outflow chamber 20. Here, part of the gas flow can escape directly through the outflow openings 28, whereas another part flows into the clearance volume 32 via the tube section 40. This gas flow is forced to deflect by 180° in the clearance volume 32, accompanied by the deposit of particles contained therein, after which it leaves the clearance volume 32, once again via the tube section 40, and flows radially outwards towards the outflow openings 28.

Radially outside of the tube section 40, a further annular clearance volume 41 is produced in the outflow chamber 20 by the shape of the partition disk 36, and particles can also be deposited here.

In order to retain a highest possible portion of particles in the gas generator 10, the total area of the inflow openings 24 of the combustion chamber 14 is smaller than the total area of the flow-through opening between the clearance volume 32 and the outflow chamber 20, this flow-through opening only being formed by the central opening 34 of the partition disk 36.

Figure 2:
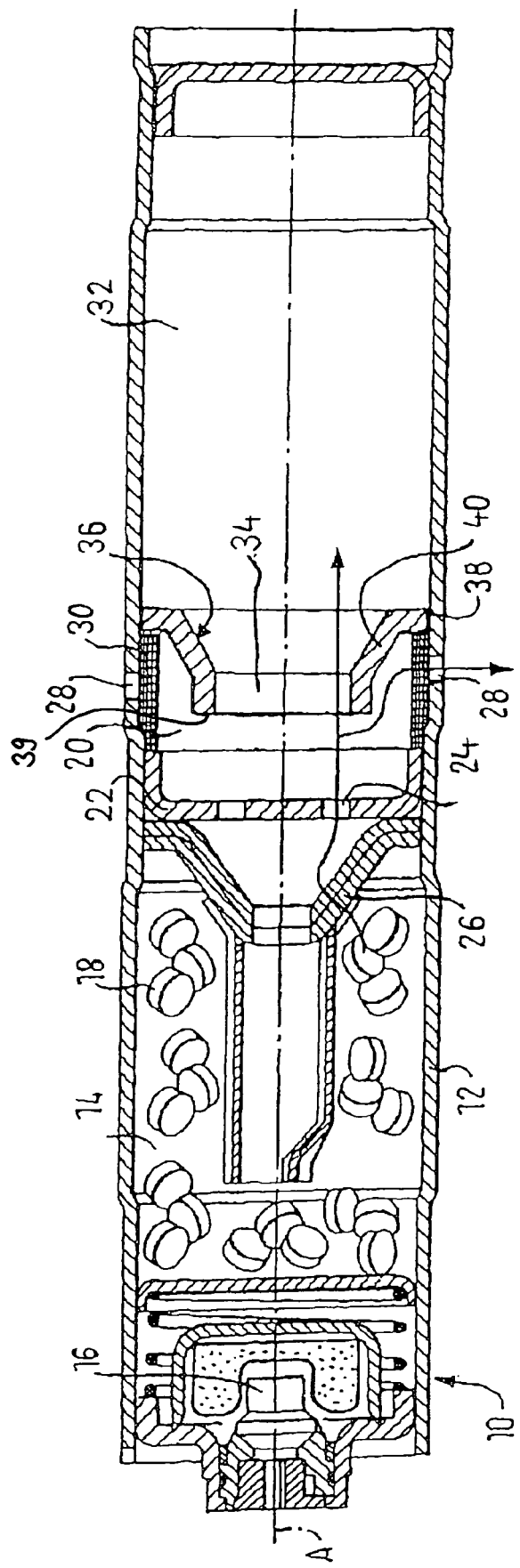
FIG. 2 shows a schematic sectional view of a gas generator according to a second embodiment of the invention.

FIG. 2 shows a gas generator 10 according to a second embodiment of the invention. Here, the same, or functionally the same components carry the same reference numbers, and in the following, only the differences with respect to the first embodiment are discussed.

Unlike the gas generator of FIG. 1, with the gas generator 10 of FIG. 2, the partition disk 36 is disposed much closer to the separation wall 22, by means of which there is a volume ratio of the outflow chamber 20 to the clearance volume 32 of approx. 30%. Moreover, the tube section 40 is no longer cylindrical in form over its whole length, but rather a section located between its free end 39 and the partition disk 36 extends towards the outflow chamber 20 in the shape of a truncated cone. In this way, a type of nozzle-shape of the tube section 40 is produced.

A further essential difference with respect to the first embodiment is that the tube section, as observed from the clearance volume 32, extends along the axis A up to beyond the outflow openings 28 of the outflow chamber 20. In this way, a large part of the gas flowing via the inflow openings 24 into the outflow chamber 20 is directed into the clearance volume 32; only a very small portion of the gas flow moves directly to the outflow openings 28.

Again, the cross-section of the opening 34 is greater than the total area of the inflow openings 24 of the combustion chamber 14.

A gas generator 10 according to a third embodiment of the invention (see FIG. 3) is different from those described above in that the tube section 40 of the partition disk 36 extends axially over the whole length of the outflow chamber 20. The free end 39 of the tube section 40 thus rests against the separation wall 22 of the outflow chamber 20 near to the combustion chamber 14. In this way, the clearance volume 32 is in fluid communication with the combustion chamber 14, and an annular outflow chamber 20 is formed. The separation wall 22 has just one centrally disposed inflow opening 24 through which the gas produced in the combustion chamber 14 flows directly into the tube section 40 of the partition disk 36.

In order to create a flow connection between the clearance volume 32 and the outflow chamber 20, several first flow-through openings 42 are provided in the partition disk 36 radially outside of the tube section 40. These create a direct connection to the outflow chamber 20 and are disposed relatively close to the outflow openings 28 of the outflow chamber 20, because of which gas flowing out of the clearance volume 32 is deflected by these flow-through openings 42 by approximately 90° before it reaches the outflow openings 28.

Moreover, on its free end 39 resting against the separation wall 22, the tube section 40 has several second flow-through openings 44 by means of which the inside of the tube section 40 is in fluid communication with the outflow chamber 20. A small portion of the gas flow from the combustion chamber 14 can thus flow through the second flow-through openings 44 directly to the outflow openings 28 of the housing 12. The significantly larger part of the gas however flows out of the tube section 40 into the clearance volume 32, and from this via the first flow-through openings 42 or the tube section 40 and the second flow-through openings 44 into the outflow chamber 20. The second flow-through openings 44 are disposed further away from the outflow openings 28 than the first flow-through openings 42. The gas flowing out of the clearance volume 32 via the second flow-through openings 44 is therefore deflected once again by almost 180° before it reaches the outflow openings 28. The total area of the second flow-through openings 44 is approximately 30% of the total area of the first flow-through openings 42.

Figure 3:
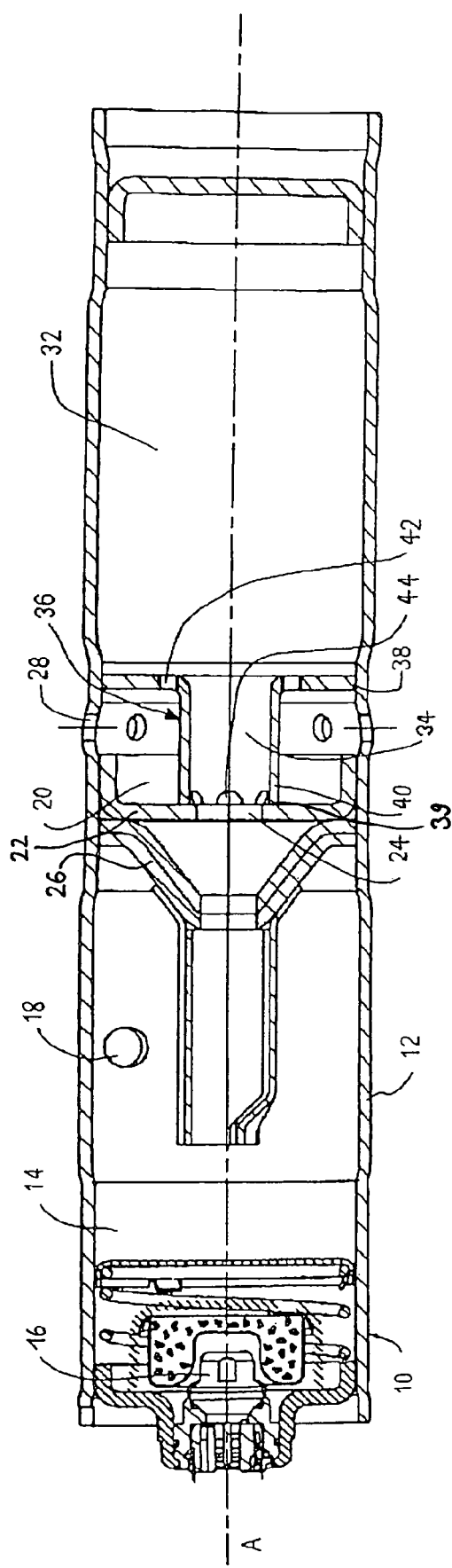
FIG. 3 shows a schematic sectional view of a gas generator according to a third embodiment of the invention.

With the embodiment according to FIG. 3, the volume ratio of the outflow chamber 20 to the clearance volume 32 is, like the others, between 10 and 50%, in this case approximately 30%. Once again, the total area of the flow-through openings between the clearance volume 32 and the outflow chamber 20, formed here by the first flow-through openings 42 and the second flow-through openings 44, is greater than the area of the inflow opening 24 in the separation wall 22 to the combustion chamber 14.

Contrary to the embodiments shown above, no filter is provided in the outflow chamber 20.

Figure 4:
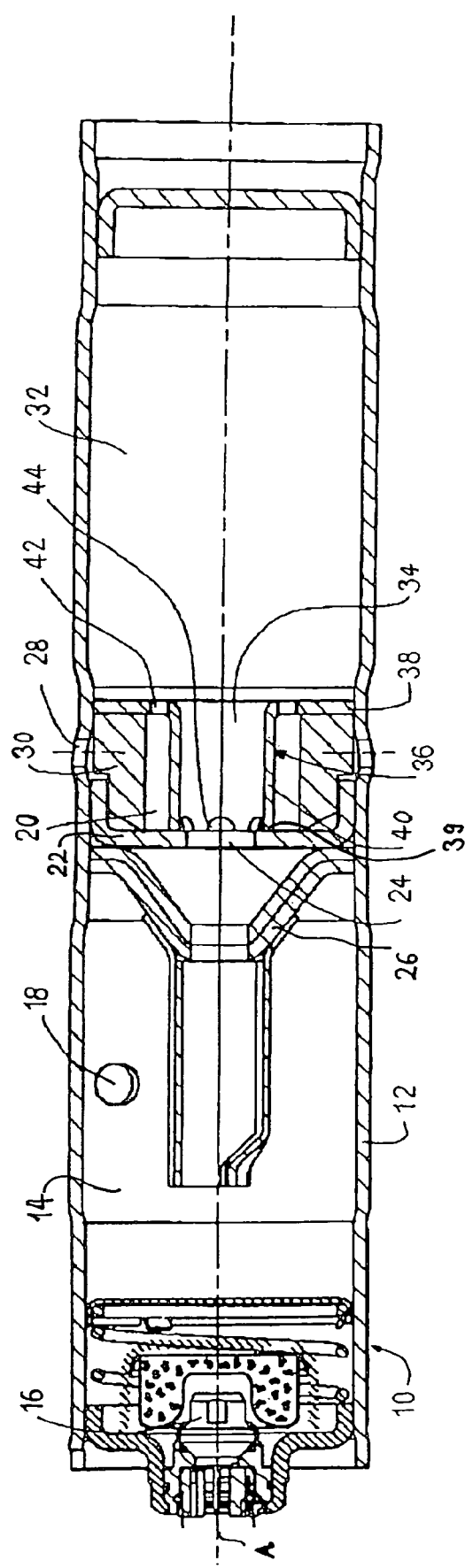
FIG. 4 shows a schematic sectional view of a gas generator according to a fourth embodiment of the invention.

FIG. 4 shows a fourth embodiment of a gas generator 10 according to the invention which is only different from the embodiment shown in FIG. 3 in that a filter 30 is disposed in the outflow chamber 20 in front of the outflow openings 28.

The invention claimed is:
1. A gas generator comprising
a tubular housing (12) in which a combustion chamber (14) containing a propellant charge (18), an outflow chamber

(20) and a clearance volume (32) are disposed, positioned behind one another axially, a partition disk (36) being provided between the clearance volume (32) and the outflow chamber (20) and having a central opening (34) and an integrally formed tube section (40) which surrounds and defines the opening (34) and extends to its free end (39) away from the clearance volume (32) into the outflow chamber (20) towards the combustion chamber (14), wherein the partition disk (36) has several first flow-through openings (42) by means of which the clearance volume (32) is in direct fluid communication with the outflow chamber (20), wherein the tube section (40) has several second flow-through openings (44) by means of which the inside of the tube section (40) is in fluid communication with the outflow chamber (20).

2. The gas generator according to claim 1, wherein in the region of the outflow chamber (20), the housing (12) has several outflow openings (28), and the tube section (40) of the partition disk (36) extends axially, as observed from the clearance volume (32), into the outflow chamber (20) up to beyond the outflow openings (28).

3. The gas generator according to claim 1, wherein the tube section (40) extends axially over the whole length of the outflow chamber (20).

4. The gas generator according to claim 3, wherein the free end (39) of the tube section (40) rests against a separation wall (22) of the outflow chamber (20) near to the combustion chamber (14).

5. The gas generator according to claim 1, wherein the ratio of the total area of the second flow-through openings (44) to the total area of the first flow-through openings (42) is 10 to 50%.

6. The gas generator according to claim 1, wherein the first flow-through openings (42) are disposed near to outflow openings (28) which are formed in the housing (12) in the region of the outflow chamber (20).

7. The gas generator according to claim 1, wherein the second flow-through openings (44) are disposed a distance away from outflow openings (28) which are formed in the housing (12) in the region of the outflow chamber (20).

8. The gas generator according to claim 1, wherein the volume of the outflow chamber (20) is 10 to 50 of the volume of the clearance volume (32).

9. The gas generator according to claim 1, wherein the combustion chamber (14) has a separation wall (22) with at least one inflow opening (24), and at least one flow-through opening (34; 42, 44) is provided between the clearance volume (32) and the outflow chamber (20), the total area of the at least one inflow opening (24) being smaller than the total area of the at least one flow-through opening (34; 42, 44).

10. The gas generator according to claim 1, wherein a filter (30) is disposed in the outflow chamber (20).

11. The gas generator according to claim 1, wherein gas flowing into the clearance volume (32) can only leave the gas generator via the outflow chamber (20).

12. The gas generator according to claim 5, wherein the ratio of the total area of the second flow-through openings (44) to the total area of the first flow-through openings (42) is 30%.

13. The gas generator according to claim 1, wherein the volume of the out-flow chamber (20) is 30% of the volume of the clearance volume.

14. The gas generator according to claim 1, wherein the opening in the partition disk directs the gas to flow from the outflow chamber (20), into the clearance volume (32), and then back into the outflow chamber (20) before exiting the housing (12).

15. The gas generator according to claim 14, wherein the integrally formed tube section (40) directs the gas to flow both into and out of the clearance volume (32).

* * * * *